United States Patent [19]
Parra

[11] Patent Number: 5,870,700
[45] Date of Patent: Feb. 9, 1999

[54] BRAZILIAN PORTUGUESE GRAMMAR CHECKER

[75] Inventor: Jose Fernando Correa Parra, Sao Paulo, Brazil

[73] Assignee: DTS Software, Inc., Miami, Fla.

[21] Appl. No.: 625,134

[22] Filed: Apr. 1, 1996

[51] Int. Cl.⁶ .............................. G06F 17/28; G06F 17/27
[52] U.S. Cl. ................................... 704/9; 704/8; 704/10; 707/532
[58] Field of Search ................................. 704/10, 8, 9, 1, 704/2, 257; 395/12; 707/530, 531, 532, 533, 536

[56] References Cited

U.S. PATENT DOCUMENTS

| | | | |
|---|---|---|---|
| 4,958,285 | 9/1990 | Tominaga | 704/8 |
| 5,029,085 | 7/1991 | Ito | 704/9 |
| 5,060,155 | 10/1991 | Van Zuijlen | 704/9 |
| 5,418,717 | 5/1995 | Su et al. | 704/9 |
| 5,475,588 | 12/1995 | Schabes et al. | 704/9 |
| 5,550,934 | 8/1996 | Van Vliembergen et al. | 382/229 |

*Primary Examiner*—Joseph Thomas
*Attorney, Agent, or Firm*—Robert M. Downey, P.A.

[57] ABSTRACT

A process for checking the Brazilian-Portuguese grammar of original text provided by a user. For each sentence, a token is generated to correspond to each of the words in the sentence. For each word in the sentence, an orthographic dictionary is searched to find possible variations in spelling, meaning and grammatical classification. Each token is expanded to include the variations in spelling, meaning and grammatical classification of its corresponding word. Each token is submitted to a heuristic process for excluding any variation which is incompatible with the token's juxtaposition within the sentence. Pre-analysis rules are applied to each token to identify and determine positionally correct alternatives for select pre-analysis errors in grammar based on the juxtaposition of each word within said sentence. An analysis tree, containing all of the tokens for the sentence and recording syntactic classification of the tokens and groups of tokens, is generated for the sentence. A set of grammar rules having terminal elements, special predicates, and non-terminal elements is generated as well. The set of grammar rules is applied to each token of the analysis tree by following analysis paths, including a so-called low-cost analysis path, in order to find cost errors in the analysis tree. It is determined which of the analysis paths is the low-cost analysis path, wherein the low-cost analysis has the fewest cost errors for the sentence. Any cost errors found in the analysis tree by analysis via the low-cost analysis path are reported to the user.

13 Claims, 2 Drawing Sheets

BRAZILIAN PORTUGUESE GRAMMAR CHECKER

FIELD OF THE INVENTION

This invention relates generally to grammar checkers, and more specifically, to an automated grammar check for Portuguese as it is spoken in Brazil and the procedures and structures for use therewith.

BACKGROUND OF THE INVENTION

The technology for grammar checkers has reached the point of yielding feasible results from a business perspective. Several products are available for English-language grammar checks. However, because languages differ from each other in a variety of ways, it is very difficult to apply the analytical methods for one language to the grammar of another.

Portuguese, as it is used in Brazil, is particularly difficult in this respect. While it stems from Latin, it has very different grammatical rules than do other so-called "romance languages" such as Spanish or French. Brazilian Portuguese demands a grammar check specifically designed to solve its particular rules.

A grammar checker would be most valuable to someone who did not have great command of the rules of grammar. However, grammar checkers are often limited to pinpointing errors, providing no solutions. This fact greatly reduces the grammar checker's usefulness to those to which it could be most beneficial.

Thus there is a need for a grammar checker designed specifically for Brazilian Portuguese.

In addition, there is a need for such a grammar checker which suggests corrections to detected errors.

SUMMARY OF THE INVENTION

The present invention fulfills the need in the art. Broadly described, the present invention provides an automated grammar check for Portuguese as it is spoken in Brazil and the procedures and structures for use therewith.

In a preferred embodiment of the present invention, a process is provided for checking the Brazilian-Portuguese grammar of original text provided by a user. The original text (having at least one sentence with a beginning, at least one word, punctuation, and an end) is received as a string of accentuated characters. For each sentence, a token is generated to correspond to each of the words in the sentence. For each word in the sentence, an orthographic dictionary is searched to find possible variations in spelling, meaning and grammatical classification. Each token is expanded to include the variations in spelling, meaning and grammatical classification of its corresponding word. Any words that do not have exact matches in said orthographic dictionary are reported to the user. Each token is submitted to a heuristic process for excluding any variation which is incompatible with the token's juxtaposition within the sentence. Pre-analysis rules are applied to each token to identify and determine positionally correct alternatives for select pre-analysis errors in grammar based on the juxtaposition of each word within said sentence. The pre-analysis errors and positionally correct alternatives are reported to the user.

An analysis tree—containing all of the tokens for the sentence and recording syntactic classification of the tokens and groups of tokens—is generated for the sentence. A set of grammar rules having terminal elements, special predicates, and non-terminal elements is generated as well. Each grammar rule defines one of the non-terminal elements as a function of terminal elements, other non-terminal elements, and special predicates. Each of the non-terminal elements is defined by the grammar rules. The terminal elements are defined implicitly in the analysis. The special predicates dictate agreement analysis and analysis control. Each grammar rule and each token has a map of properties following the same format.

The set of grammar rules is applied to each token of the analysis tree by following analysis paths, including a so-called low-cost analysis path, in order to find cost errors in the analysis tree. It is determined which of the analysis paths is the low-cost analysis path, wherein the low-cost analysis path has the fewest cost errors for the sentence. Any cost errors found in the analysis tree by analysis via the low-cost analysis path are reported to the user.

In the preferred embodiment, each grammar rule has a "first." The first is a set of all properties that a token may possess in order to be compatible with the grammar rule. During application of the set of grammar rules to the analysis tree, each token is submitted for analysis only to those of the grammar rules for which the token satisfies the first.

In an alternative form of the present invention, during application of the set of grammar rules to the analysis tree, the set of grammar rules is applied in its entirety on one of the analysis paths prior to the application of any of the grammar rules to another of the analysis paths. This proceeds until all of the analysis paths have been exhausted. Additionally, the step of determining which of the analysis paths is the low-cost analysis path is done as follows.

As the grammar rules are being applied to each analysis path, a running count of cost errors found therein is maintained. A cost is assigned to each analysis path which has had all of the grammar rules applied thereto, the cost being a function of the total of cost errors found therein. The analysis paths which has had all of the grammar rules applied thereto and which has the lowest cost is maintained in a first memory address. The cost associated with the analysis path maintained in the first memory address is kept in a second memory address. Application of the grammar rules to any of the analysis paths for which the running count exceeds the cost stored in the second memory address is aborted, as is application of the grammar rules to any of the analysis paths for which the running count exceeds a predetermined threshold cost.

An alternate form of the present invention provides that after application of the set of grammar rules to the analysis tree, the analysis tree is compared with the original text. Any of the words in the original text which are different from the words corresponding to the tokens in the analysis tree are reported to the user. Additionally, a grammatically correct alternative to each said cost error found can be suggested.

The analysis tree may have levels of syntactic classifications arranged in hierarchial order of breadth. The grammatically correct alternative to the cost error can therefore be generated with reference only to those levels of the analysis tree which are affected by the cost error.

In an alternate form of the present invention, as the grammar rules are being applied to the analysis tree, a backtracking point is tracked within the analysis path where a cost error was most recently found. Upon aborting application of the grammar rules to any of the analysis paths with a running count exceeding the cost stored in said second memory address, application of the grammar rules is resumed from the backtracking point until all possible paths through the analysis tree from the backtracking point have been exhausted.

An alternate form of the present invention provides a software system having a set of instructions for controlling a general purpose digital computer in the above process of checking the Brazilian-Portuguese grammar of original text provided by a user provides means for accomplishing the above process.

Accordingly, it is an object of the present invention to provide a grammar checker designed specifically for Brazilian Portuguese.

It is an object of the invention to provide such a grammar checker which suggests corrections to detected errors.

These and other objects, features, and advantages of the present invention may be more clearly understood and appreciated from a review of the following detailed description of the disclosed embodiment and by reference to the appended drawings and claims.

BRIEF DESCRIPTION OF THE DRAWINGS

For a fuller understanding of the nature of the present invention, reference should be made to the following detailed description taken in conjunction with the accompanying drawings in which.

DETAILED DESCRIPTION OF THE PREFERRED EMBODIMENT

The computer-implemented process of the present invention is directed to analysis of Brazilian-Portuguese grammar in original text provided by the user.

The grammar check analysis is divided into several stages. In each stage, the received structure is modified by adding information or creating new structure.

A. OVERVIEW OF THE MAJOR STEPS

The preliminary processes discussed below (Structural Analysis, Lexical Analysis, Orthographic Analysis) are discussed generally above to provide an overall view of the grammar checker. The primary invention here encompasses the system for grammatical analysis, which will be discussed in detail.

Figure 1:
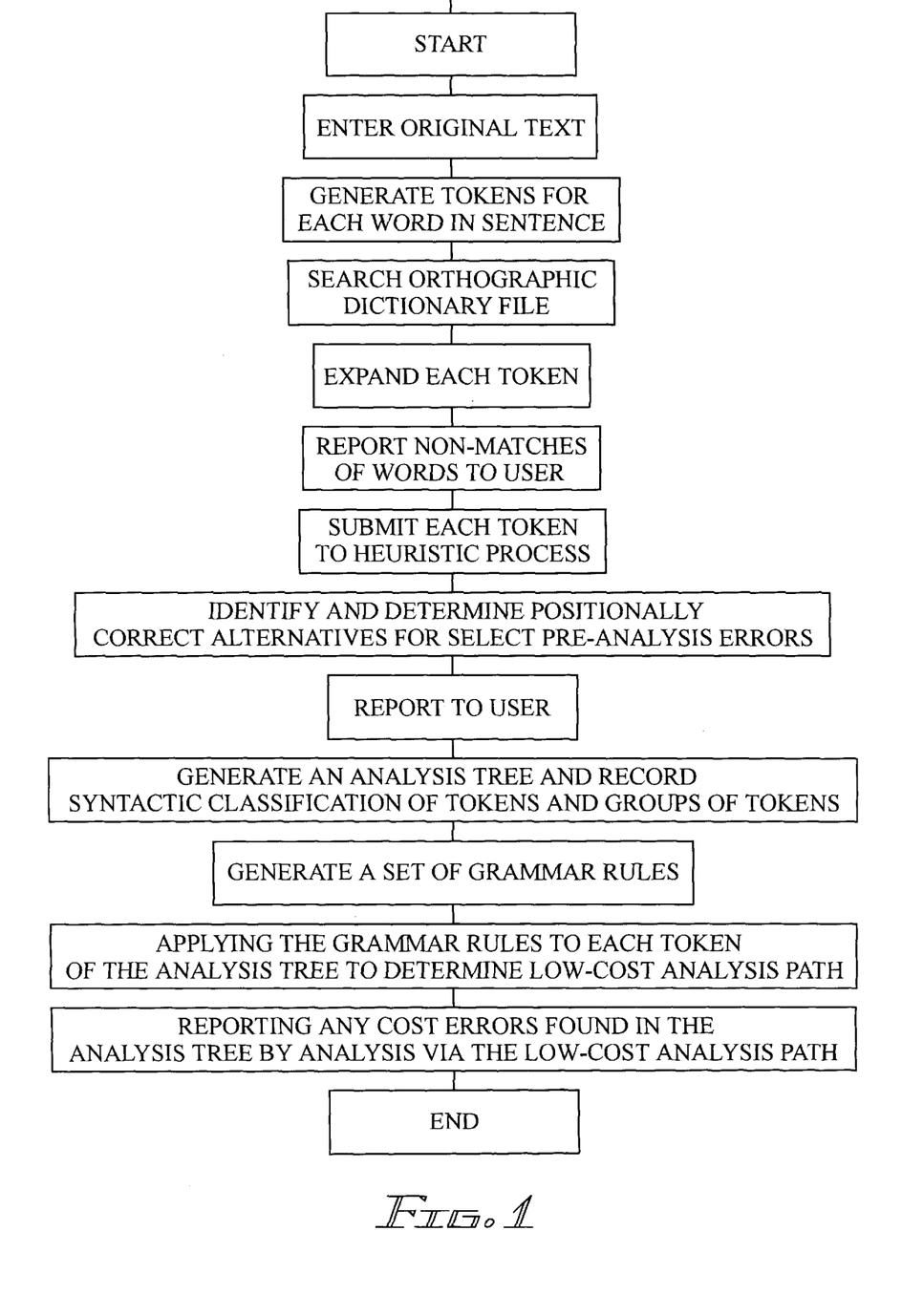
FIG. 1 shows a flow chart of a computer-implemented grammar checking process, in accordance with a preferred embodiment thereof.
Figure 2:
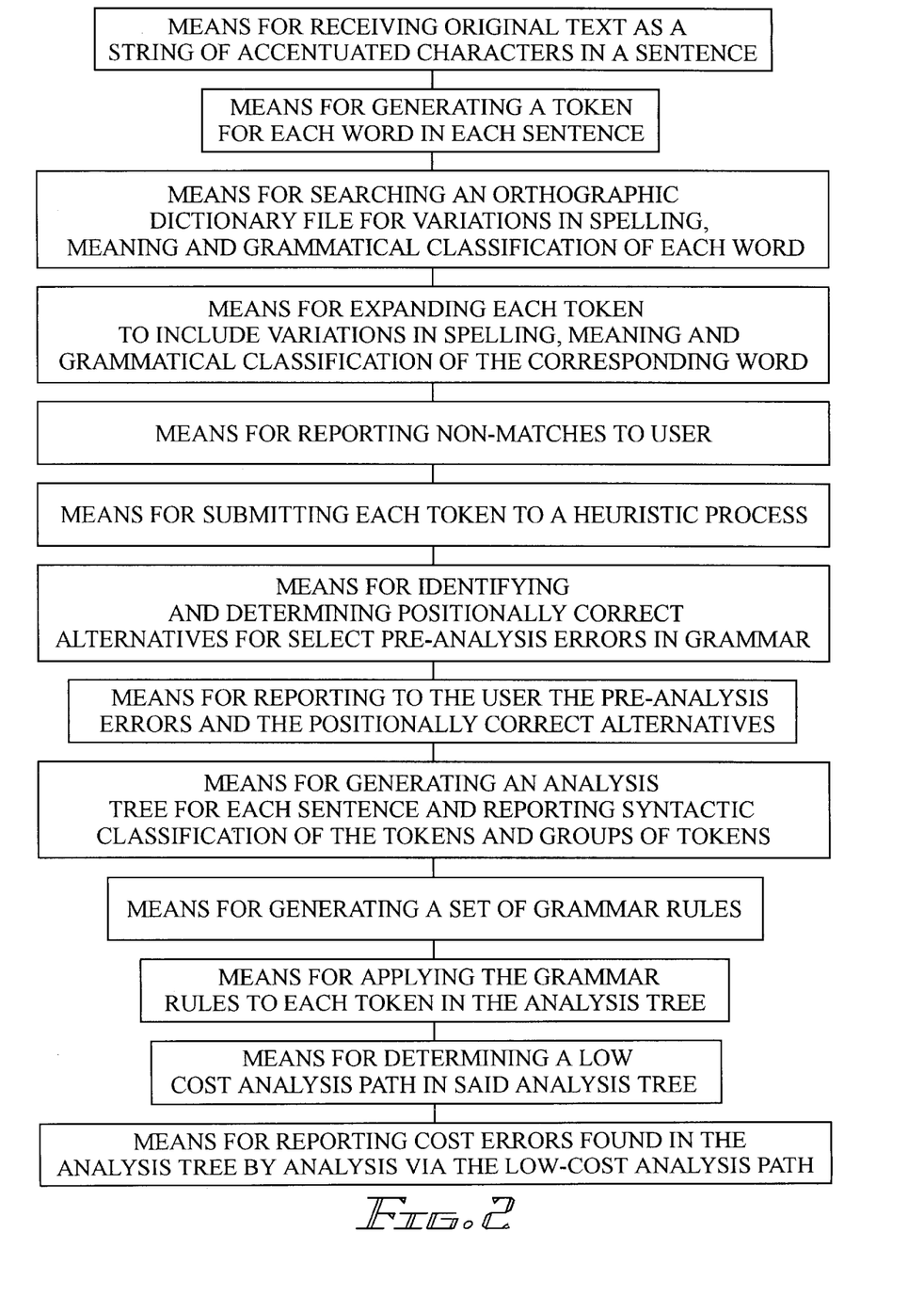
FIG. 2 shows a block diagram of a preferred embodiment of the computer system for checking Brazilian-Portuguese grammar of original text.

As shown in FIGS. 1–2, the first stage is the structural analysis. At this stage, the original text is received and entered into the computer as a string of characters (ISO characters). Each sentence is analyzed separately as a unit by a structural analysis program installed in memory of the computers. Punctuation "events" (including quotation marks and parenthesis) are reviewed. Errors detected at this stage include too many or too few spaces between a word and a punctuation mark, isolated or "open" parenthesis or quotation marks (incomplete pairs), and failure to finish a sentence with a punctuation mark. If an error is detected, it is reported immediately to the error diagnosis module. Once this stage of the analysis is complete, the size of the sentence being analyzed is determined, with the end of the sentence marked by appropriate punctuation ('.', '!', '?', or '. . .'). Here is an example of the structural analysis:

Sample text: Pedro,o meu vizinho,não está em casa. Ele foi ao jogo de futebol.

Analysis: Pedro,[1],o meu vizinho,[2] não está en casa.[3] Ele foi ao jogo de futebol.

Key: 1—blank space missing
2—excess blank space
3—end of sentence

Next comes the lexical analysis. A list of "TOKENS" is generated to be submitted to an orthographic analysis program installed in the memory of the computer. TOKENS are classified into five types: WORD, ACRONYM, PUNCTUATION, NUMBER, and END-OF-LINE (EOL). A WORD is a sequence of alphabetic symbols, including accented letters, uninterrupted by any other type of symbol such as a blank space, punctuation mark, or numeral. The structure used to record a TOKEN contains various other fields, which are completed at later stages of the analysis, for example in the orthographic analysis discussed next. Here is an example of lexical analysis:

| Sample text: | Pedro, o meu vizinho, não está em casa. Ele foi ao jogo de futebol. |
|---|---|
| Analysis: | |
| Pedro | WORD |
| , | PUNCTUATION |
| o | WORD |
| meu | WORD |
| vizinho | WORD |
| , | PUNCTUATION |
| não | WORD |
| está | WORD |
| em | WORD |
| casa | WORD |
| . | PUNCTUATION (actually, the '.' is consumed, and only the EOL is kept). |
| | END-OF-LINE |

During the stage or orthographic analysis, each WORD included in the TOKEN list is submitted to a search in the ORTHOGRAPHIC DICTIONARY file. This dictionary includes various words stored in the following forms: radical, inflection ending, grammar information, and accent information.

"Radicals" are stored without any accents so that all imperfect homographs corresponding to the word in the text may be found and utilized in the analysis. The following events are identified here: imperfect homographs (different accent), accentuation errors, and unlisted words. Any such errors are reported to the error diagnosis module and then transmitted to the user interface module. After the user chooses the appropriate measure to be taken (i.e., correct or ignore the reported error), the action is recorded and the process continues with the next word in the list.

The TOKEN corresponding to each WORD found in the dictionary is expanded with a list of possible meanings, each including information on grammar class and properties (plural or singular, gender, person, mood, etc.). Here is an example of the orthographic analysis:

Sample text: Pedro, o meu vizinho, não está em casa. Ele foi ao jogo de futebol.

Analysis:

está WORD
    esta [this]—demonstrative pronoun, singular, feminine
    está [is]—linking verb—third person, singular, indicative mood casa WORD
    casa [home]—noun, feminine, singular
    casa [marries]—direct and indirect transitive verb—third person, singular, indicative
    casa [be married]—direct and indirect transitive verb—second person, singular, imperative Upon generation of the list of expanded TOKENS, each TOKEN is subject to preliminary processing. A heuristic process excludes any meaning with are incompatible with each TOKEN based upon its placement with the sentence and the classes of the surrounding words. This elimination of incompatible classes limits the search and saves time.

At this stage, combinations and contractions are identified, as are adverbial phrases, dates, special uses of the accent grave (crasis), errors in use of the verb 'haver', use of 'meia' and 'muita' in lieu of paronymous adverbs, 'mim' versus 'eu', and others. Here is an example of preliminary processing of the TOKEN List:

Sample text: Vende-se uma casa.

Analysis: The particle 'se' can generally be any of the following: objective case pronoun, subordinating conjunction, or adverbial conjunction. However, the precedent word in this case ends in a hyphen, making it impossible for the 'se' to be a conjunction.

Next, the list of expanded TOKENS is submitted to a process of grammatical analysis, by means of a "generative grammar" which has been modified by a special predicates for grammatical events. At this stage, the following "cost errors" are found: verb/noun agreement, improper homograph, excess or missing commas, improper use of pronoun (i.e., nominative/objective case). These errors are continuously counted without interrupting the analysis.

During the analysis process, an analysis tree is generated to record the syntactic classification of the various TOKENS and groups identified. Here is an example of an analysis tree:

| Sample tree: | | sentence |
| --- | --- | --- |
| subject | | predicate |
| | | verbal predicate |
| noun phrase | verbal form | direct object |
| article noun | adjective adverb | intransitive verb EOL |
| Sample text: | | |
| O gato | preto não | morreu |

If a sentence is successful—no error recorded—it is deemed correct, and its grammatical analysis is complete. The client process of the analyst is responsible for preparing and submitting a new sentence for analysis.

In the case of a successful analysis with a non-zero error count, the analysis tree with the lowest cost is maintained, and the analysis continues until all rules are exhausted or an analysis tree without error is found.

At the end of the analysis, if errors are recorded, these are forwarded to the diagnosis and suggestions module. According to the error, the module creates suggestions and forwards the error and suggestion list to the user interface module.

Some steps of error processing occur after the construction of the analysis tree.

To deal with errors concerning misplacement of atonic pronouns in the objective case, the attractive words are considered, such as negative adverbs or pronouns. If an oblique pronoun follows a verb, which in turn follows one such attracting word, a suggestion is made to change the placement of the pronoun. Two other situations may demand the placement of an oblique (objective) pronoun after the verb: verbs in the infinitive mode and the beginning of sentences.

Comma misplacements are detected by using terminal symbols that accept a null TOKEN. Upon construction of the tree, such terminals are identified, generating errors whenever they do not correspond to an expected event. For example, grammar permits two types of terminals: NO-COMMA or RECOMMENDED-COMMA. If, within the text, a comma corresponds to the terminal NO-COMMA, or there is no comma corresponding to the terminal RECOMMENDED-COMMA, an error will be indicated.

A similar method is used for the various forms of 'porque' (porque, por que, and porquê—respectively meaning roughly: why, because, and the reason why). All TOKENS that fit any of the forms of this word receive all three classifications. At the end of the analysis, if the expected form for the TOKEN is not found, an error is indicated.

Almost all errors generate suggestions to be presented to the user. Most suggestions are generated as the errors are found, when all the elements required are available. The most complex process is that of generating suggestions for agreement errors, in which case it is necessary to identify which words require inflection and which may remain unchanged. Here is an example of the grammatical analysis for agreement errors:

Sample text: O homem de cabelos grisalhos é engraçado.
Suggestions:
O homem de cabelos grisalhos é engraçado.
Os homens de cabelos grisalhos engraçados.
A mulher de cabelos grisalhos e' engragada.
As mulheres de cabelos grisalhos são engraçadas.
Note that the phrase "de cabelos grisalhos" remains unaltered for all suggestions.

B. DETAILS OF GRAMMATICAL ANALYSIS

The grammar rules used in the analysis define the nonterminal elements as a function of terminals and other nonterminal elements. Grammar rules are expressed as follows:

| prefix | : | left side | | | right side |
| --- | --- | --- | --- | --- | --- |
| (term to be defined) | | (rule representing term) | | | (alternate definitions) |

Not every rule contains a 'right side' in its expression. In the expressions of the rules, terminal elements will be represented by capitalized nouns, while nonterminal elements are shown in lower case. Here is an example:

subject: PERSONAL_PRONOUN|noun_phrase

'Subject is the term being defined. 'PERSONAL_PRONOUN' is a terminal. The two clauses defining 'subject' are separated by '|'.

The evaluation of terminal elements is embedded in the grammatical analysis mechanism and does not require being (and should not be) defined as a function of others.

Terminals such as NOUN, ADJECTIVE, ADVERB, etc. represent the grammatical class of a word. In addition, terminals are provided to identify subclasses (PERSONAL_PRONOUN, INTENSITY_ADVERB, NEGATIVE_ADVERB, etc.) or characteristics (COMPARATIVE, MORE_THAN, LESS_THAN, etc.).

Additional terminals are provided which act as controls, allowing a certain degree of programming.

Each grammatical line may contain special predicates controlling the agreement rules. Additional special predicates may be included under the objectives for a rule to allow for rule analysis control. The following table shows a list of special predicates with an explanation of the usefulness of each:

Here is a simplified example:
sentence: subject predicate CVN(1,2)
Interpretation: One sentence is made of a subject and a predicate. The subject and predicate must agree in gender, number and person.

Note that each of the non-terminal elements "subject" and "predicate" must also be defined for the above definition of sentence to be complete. Therefore, the definition continues as follows:

subject: PERSONAL_PRON CVN(1) | ARTICLE NOUN CN (1,2) PES(3)

Interpretation: A subject is made of a personal pronoun, assuming its gender, number and person. A subject may also be made up of an article followed by a noun. Such two elements must agree in gender and number. Gender and number of the noun must be transmitted to the subject, as well as the information that it is a third person.

predicate: VERB complement CV(1) GEN(0)

Interpretation: A predicate is made up of a verb followed by a complement. The number and person of the verb must transmitted to the predicate. The predicate accepts either gender (masculine or feminine).

The grammatical analysis process is carried out by an interpreter program installed in the memory of the computer and being adapted to interpret grammar rules with backtracking and cutting resources. Under the grammar rules, the non-terminal symbols causes the analysis state to be pulled and the search for new rules that have as start the non-terminal toe expanded. Each terminal symbol encountered under a grammar rule is verified against the current token in the token list, aiming at a matching of attributes. If the token and the symbol are compatible, both are accepted and the interpreter goes to the next symbol of the grammar rule and to the next token of the list. When the matching fails, one symbol under the grammar rule and one token in the list are receded, searching for the next possible matching (backtracking). If an attempt to recede to the beginning of a rule occurs, this rule fails, provoking the search for a new rule to the non-terminal symbol. When the interpreter reaches the end of a rule without faults, the identification of the non-terminal symbol that starts it was successful. The analysis state is unpiled and the non-terminal symbol of the previous rule is accepted. If all the rules for a non-terminal symbol are tested without a matching being found, there was a fault in the symbol identification. The analysis state is unpiled and the previous rule fails, provoking the search for a new rule. The CUT symbol controls the backtracking mechanism marking a point to the rule that, if hit during the backtracking, causes the rule to fail without retrocession to the beginning of the rule. When the terminal symbols match the tokens in the list, some parameters are copied from the tokens to the analysis tree. So, gender, number, grammatical order and other parameters for the non-terminal symbols are being defined. According to the rules defined by special attributes (e.g.: CN(1,2)—testing noun concordance), some of these parameters are disseminated in the tree and tested against other symbols parameters.

Special predicates for processing grammatical events have been added to the basic mechanism. For example, the CN (i,j) predicate tests noun agreement (gender and term) of the order i and j terms for the rule under analysis.

In analyzing the grammar a sentence, some errors will not entail a rule default, but instead increase the "cost" stored in the analysis structure. Spelling errors, agreement errors, comma misplacement, and pronoun misplacement each have a cost. Under the analysis process, a sentence is deemed correct whenever an analysis is successfully completed (no "faults") and the accrued cost for errors is zero. If cost has accrued, the analysis tree and its associated cost (if final cost reached is lower than the stored cost) are saved and the analysis continues as if a fault had occurred (EOL predicate).

Any errors detected during this stage of the grammatical analysis are reported at its end. The tree resulting form the analysis represents the raw material for the suggestion maker. Several routines perform a post-analysis of the tree and point out errors and suggestions.

Analysis involving "generative grammar" can result in exponentially increasing complexity. In order to speed up the analysis, several systems are employed.

Once the list of expanded TOKENS (with accompanying grammar information) is generated, and prior to the grammatical analysis, a heuristic process eliminates any meaning which are incompatible for each TOKEN, based upon the placement of each TOKEN within the sentence and the classes of surrounding words. The elimination of incompatible classes limits the search and saves time. Here is an example:

Sample text: Vende-se uma casa.

Analysis: In general, the particle 'se' can be any of the following: objective case pronoun, subordinating conjunction, or adverbial conjunction. However, in this case, the precedent word ends in a hyphen, making it impossible for the 'se' to be a conjunction.

Other specific events are also dealt with prior to the grammatical analysis. These specific "pre-analysis errors", as well as a summary of the rules for simplifying their analysis, are discussed in the following paragraphs.

The terms "no," "na," "nos," or "nas" can signal either a combination of the preposition "em" plus a definite article or an oblique pronoun. If the precedent word does not end with a hyphen, the particles "no", "na" and "nas" cannot be oblique pronouns (objective case).

"O", "a", "os", or "as" can be any of the following: an article, an oblique pronoun, or a demonstrative pronoun. If neither the precedent nor the following word is a verb, "o", "a", "os" and "as" cannot be oblique pronouns (objective case).

Further, "a" can be a preposition, an article, an oblique pronoun, or a demonstrative pronoun. If the antecedent word ends with a hyphen, or if it is the last word of a sentence, "a" cannot be a preposition. If the following word is a demonstrative or oblique pronoun, "a" is a preposition. If the following word is an infinitive verb, "a" is a preposition or an oblique pronoun.

"Um" or "uma" can be either an article, a numeral, or an indefinite pronoun. Before an impersonal infinitive, "Uma" and "um" are not articles. Whenever the following word is not an adjective, noun, indefinite adjective pronoun, or infinitive, then the current word is not an article.

Some nouns are identical to verbal forms. For example, "canto" can be either a noun or the indicative of the verb "cantar." Whenever the precedent word is a definite article but not an oblique pronoun, or if it is an indefinite article, possessive pronoun, or adjective demonstrative pronoun, then the current word is not a verb.

Any event of crasis before masculine or infinitive words is incorrect.

Repeated words within a sentence are shown, and the user is given the option of removing duplicates.

When several proper names in the list of tokens occur sequentially, without any other token between them, the analyzer admits that all the sequence designates the same individual, converting this sequence into a single token with the attributes inherent to the proper name.

Examples:

Fernando Henrique Cardoso foi eleito presidents.

(Fernando Henrique Cardoso was elected President.)

A costa do Estado dp Rio de Janeiro é muito bonita.

(The State of Rio de Janeiro seashore is very beautiful.)

The same agglutination mechanism identifies words composed by hyphenization, converting them into a single token with the noun attributes.

Examples:

Hoje eu não esquecerei o guarda-chuva.

(I will not forget the umbrella today.)

O pão-de-ló que Maria fez está delicioso.

(The cake Mary made is delicious.)

Several measures can be employed to reduce the size and complexity of the sentence being analyzed. A table of adverbial and prepositional idioms (à medida que, a despeito de, etc.) is created. Such idioms are identified in a sentence by comparison with the entries in the table. Once identified, they are removed from the text and replaced with a dummy word of a proper grammatical class (adverb or preposition).

Date expressions are identified by standard format (ex: 4 de maio de 1995—number "de" month "de" year). Once identified, they are removed from the text and replaced with a generic adverb. Inessential wording such as "por examplo" [for instance] and "isto é" [to wit] is eliminated to reduce the size and complexity of the sentence under analysis.

For some words with paronymous equivalents in different grammatical classes (mau x mal; mas x mais), the paronymous form of the word is included in the list of word meanings prior to the grammatical analysis. At the conclusion of the analysis, the routine for pinpointing spelling errors shall detect whether the word should have been written differently.

Any time "para mim" is followed by an impersonal infinitive, whether or not preceded by a negative adverb, is detected, "para eu" is suggested as an alternative.

In a case such as, "A porta está meia aberta," the analysis detects any use of "meia" when the following word is a participle or adjective, and the preceding word is not an article, possessive pronoun, or adjective demonstrative pronoun. The adverb "meio" is suggested as correction.

Situations are identified when the word "muita" (a series of) is used in place of the intensity adverb "muita" (much). The error is pointed out and the correct word is suggested.

In such a case as "Eu tenho muita pouca paciência", the analysis detects the use of the word "muita"—an indefinite pronoun—instead of the intensity adverb "muito."

Each grammar symbol represents a set of subrules, all with the same preceding term, united by the "|" symbol, representing an "OR" connection. During the grammatical analysis, the first subrule is tried first. If it fails, the next subrule is tried, and so on. The price, in terms of elapsed time, of trying inadequate subrules can be high. The analysis mechanism may have to be taken far, through a succession of failures, before the subrule is deemed inapplicable to the sentence. Therefore, whether and when a subrule is tried can have great impact on the speed of the analysis.

In order to optimize speed of analysis, the basic table of rules is pre-processed to determine, for each subrule, a set of properties called FIRST. FIRST is the set of all properties that a TOKEN may possess in order for that subrule to be feasible.

Upon definition of the set FIRST, a mask of bits for mapping the presence of each set property is built and added to the subrule. Each TOKEN has a map of properties with the same format as the map of subrules. The grammatical analysis mechanism, before processing a subrule, checks whether the current TOKEN satisfies any of the properties of FIRST. A simple logical AND operation is sufficient to determine whether the subrule should be tried. Otherwise, the analysis proceeds to the next subrule. The elimination of fruitless rules greatly improves the speed of analysis. Here is an example:

Subject: PERSONAL_PRONOUN|article adjective NOUN

Article: DEFINITE ARTICLE|INDEFINITE ARTICLE|""

Adjective: ADJECTIVE|""

(Note: "" denotes a blank subrule)

The FIRST for the first subrule for "subject" is {PERSONAL_PRONOUN}, and the FIRST for the second subrule is {DEFINITE_ARTICLE, INDEFINITE_ARTICLE, ADJECTIVE, NOUN}. The occurrence of ADJECTIVE is due to the possibility of "article" being blank. The occurrence of NOUN is due to the possibility of "adjective" being blank.

A hypothetical TOKEN with properties (ADVERB, INTENSITY_ADVERB, INDEFINITE_PRONOUN, ADJECTIVE) would inhibit experimenting the first subrule for subject, but would activate trial of the second subrule. This occurs because the intersection of the possible classes for FIRST token of the first subrule with the classes for the TOKEN is empty and the intersection of the possible classes for the FIRST token of the second subrule is not empty: (ADJECTIVE).

Each term of a subrule causes the interpreter to go forward if there is a match between the grammar and the sequence of TOKENS being considered. Otherwise, backtracking occurs. This is true only for normal predicates, those referring to properties of TOKENS. When the predicates for verbal and noun agreement detect any error, they add to the agreement error counter and yield a return message of success. This is because the path being followed may not be the correct path. Any errors found may be due to bad path selection. The cost is a measure of how mistaken the path is.

In this case, the analysis tree and the cost of the analysis—which grows with the number of errors found—are saved in a result buffer. The EOL predicate yields a return message of FAULT so the analysis mechanism is deceived into choosing another path. The purpose is to find less expensive paths (with fewer errors) which are intended to reflect a more faithful interpretation of the phrase.

During this subsequent analysis, the addition of paths to storage depends upon whether the cost is lower than that of paths already stored. There is no sense in proceeding with a path which has an accrued cost equal to or higher than the cost of a previously saved path. In order to speed up the analysis, whenever the accrued cost is equal to or exceeds the cost of a previously saved path, all predicated yield FAULT return messages in order to trigger backtracking of the analysis to a point of lower accrued cost.

The invention operates under the presumption that the text is intended to be correct. Therefore, when an analysis path encounters a great many errors (a predetermined threshold), the path is deemed incorrect. At that point, all predicates start yielding FAULT return messages in order to trigger backtracking of the analysis to a point of accrued cost below the limit.

The interpreter keeps each decision point in a stack, in order to be able to backtrack to this point in case of failure of later symbols or predicates. Besides decision points, the present invention also keeps the points where spelling and agreement errors are found. Thus, when the grammar checker finds errors in excess of the threshold or the previously saved cost, it may directly backtrack to the point where the last error has been found.

The CUT predicate inhibits the revaluation of predicates within a subrule, returning a FAULT if any backtracking is needed to its left. THE CUTR predicate is similar to CUT: it inhibits the evaluation of anything to its left, including all subrules therefor.

If the first subrule for predicate has been satisfied (a valid linking verb and predicative were found) and if later on a FAULT occurs, the second subrule will not be analyzed, saving time.

At the end of a successful analysis in which the cost is not zero, the analysis tree is searched for terminal elements for which the spelling differs from the originally supplied one. This stage detects accent errors and paronymous words. Here is an example:

homem público vs. home publico

The suggestion is direct, and the expected form (homem público) is presented.

Agreement errors are checked as follows. During the analysis, CN, CV, CVN predicates check the agreement of the various elements of the subrule, specified according to their arguments. If an error is found, an additional value is added to the path cost and the analysis goes on. Agreement is achieved as shown in this example:

term: article noun CN(1,2)

GEN and NUM are initialized with multi-purpose values. For each CN predicate argument (in this case, 1 and 2), the properties of the corresponding elements in the subrule are obtained (1=article, 2=noun) and the analysis proceeds with an AND for GEN and NUM, with the corresponding properties of the element. At the end, GEN and NUM are copied to the head of the list. If any of the properties is zero, there is an agreement error.

The tree is searched for CN, CV, and CVN predicates. If any of these predicates has yielded no error, it has been removed from the tree prior to this stage. Therefore, the predicates found at the suggestion stage are those that have detected an error.

From the information stored in each tree node, including the predicate, it is determined to which subrule the node belongs. Going up the tree hierarchy, the path that has been followed is examined to determine whether the error still affects this part of the tree. When the error no longer affects the mother rule, this stage of the analysis is complete. Here is an example:

Sample text: Eu gosto do menina.

The error is limited to the indirect object. Because the indirect object does not require agreement with the rest of the sentence, the analysis does not need to continue up the tree to the "verb" and "subject" level. It is sufficient to analyze only as far up as the "indirect object" nonterminal. Thus, when an error is pinpointed, it can be more specifically pointed out:

Eu gosto do menina.

Any properties which have not been affected by the agreement error (in the example above, number and person) shall be maintained. For properties which have been affected (gender in the example), all possible variations in each domain (masculine and feminine) shall be generated. For each combination of gender, number and person, the analysis proceeds down the tree, with inflection of all terminals. Here is an example:

Sample text: Eu gosto do menina.

For the error "do menina," the suggestions are "do menino" and "da menina".

If any of the inflections is impossible, it is not suggested. For example:

Sample text: Comprei uma carro . . .

Suggestions is limited to "um carro" because there is no feminine inflection for "carro."

The generated suggestions are arranged according to ascending number of altered words. If two suggestions have the same number of altered words, then the one with the fewest altered letters is presented first.

At the end of the grammatical analysis, the placement of pronouns is tested. The tree is searched for objective pronouns. For each objective pronoun found, the position of its main and auxiliary verb is determined. Also, it is determined whether there are any attractive elements (i.e., negative adverbs, personal pronouns, relative pronouns) for the oblique pronoun. After these determinations are made, the routine judges whether the pronoun is correctly placed. If not, a correct placement is suggested.

For simple verbs (without auxiliary), the following rules apply. Attractive elements require proximity of the pronoun ("Eu te amo" vs. "eu amo-te"; "Não te amo" vs. "Não amo-te"). Future present or future anterior must precede the verb. ("João te chamará" vs. "João chamará-te" vs. "João chamar-te-á"—the placement within the verb is not yet suggested). Participles do not accept placement of oblique pronouns after the verb. An oblique pronoun should not be placed at the beginning of a sentence.

For verbal phrases, the dividing line between right and wrong is even thinner, depending upon the pronoun and euphony, as illustrated by returning to the first of the above examples:

"Eu sei que vou te amar" vs. "Eu sei que te vou amar" (Portugal) vs. "Eu sei que vou amar-te"

Non eurphonic: "Eu sei que vou a amar" vs. "Eu sei que a vou amar" (Portugal) vs. "Eu sei que vou amá-la"

The list of suggestions is ordered according to commonality of use in Brazilian Portuguese, omitting or leaving for last archaic and Portugal uses.

The check for comma usage, the grammar checker uses special predicates (RECOMMENDED_COMMA and NO-COMMA) to mark where a comma is expected and where there should be no comma, respectively. In a manner similar to that for the agreement predicates, these special "comma" predicates do not result in faults if not satisfied. They only result in additions to the error counter and proceed, and the grammar checker seeks the least expensive path (having the fewest errors). Upon completion of the analysis, the tree is searched for predicates which have not been satisfied. Then suggestions (or orders, where applicable) are made for removal or addition of commas.

A special procedure is followed to deal with the choice between "por que" and "porque," Before the grammatical analysis, the sentence is searched for all variations of "porquê," which are then converted to a new "porquê," uniting the class of "porque" and "por que." This new union is utilized during the grammatical analysis. at the end of the analysis, the tree is searched for "porquês," and each one found is compared to the class used for the spelling form (joint or separate). In the case of disagreement, the error is contested and the correct form is suggested. The analysis is based on the following criteria: (1) if a conjunction, it should be "porque"; and (2) if an interrogative adverb, it should be "por que".

In many cases, the sentence is unrecognizable due to an excess of errors or due to its complexity. In addition, there do exist structures which are not identified by the grammar checker. In this case, a partial analysis of noun phrases is conducted. The sentence is searched for any elements that could indicate the beginning of a noun phrase (article, adjective, pronoun, noun). If any such element is found, the grammar checker attempts to identify the noun phrase.

This analysis is similar to that for a normal sentence, except that the nonterminal that is sought is "simplified_noun_phrase" instead of "sentence". The rules for "simplified_noun_phrase" do not accept sentences as noun phrases or as adjectives.

This partial analysis locates agreement errors that otherwise would go undetected in an unrecognizable sentence.

Although multiple embodiments are described herein, it should be understood that the inventor intends for this invention to cover other grammar checkers, not particularly described herein. For instance, the steps could be done in a different order. Or certain steps could be eliminated altogether.

What is claimed is:

1. A computer implemented process for checking Brazilian-Portuguese grammar of original text provided by a user comprising the steps of:

receiving said original text as a string of accentuated characters, said original text having at least one sentence having a beginning, a word, punctuation, and an end;

for each said sentence, generating at least one token, each said token corresponding to one said word in said sentence;

for each said word in said sentence, searching an orthographic dictionary to find possible variations in spelling, meaning and grammatical classification;

expanding each said token to include said variations in spelling, meaning and grammatical classification of said corresponding word;

reporting any of said words that do not have exact matches in said orthographic dictionary to said user;

submitting each said token to a heuristic process for excluding any said variation which is incompatible with said token's juxtaposition within said sentence;

applying pre-analysis rules to each said token to identify and determine positionally correct alternatives for select pre-analysis errors in grammar based on the juxtaposition of each said word within said sentence;

reporting to said user said pre-analysis errors and said positionally correct alternatives;

generating an analysis tree for said sentence, said analysis tree containing all of said tokens for said sentence and recording syntactic classification of said tokens and groups of said tokens;

generating a set of grammar rules having terminal elements, special predicates, and non-terminal elements, wherein each said grammar rule defines one of said non-terminal elements as a function of said terminal elements, other said non-terminal elements, and said special predicates;

wherein each of said non-terminal elements is defined by said grammar rules; wherein said terminal elements are defined implicitly in the analysis; wherein said special predicates dictate agreement analysis and analysis control; wherein each said grammar rule and each said token has a map of properties following the same format;

applying said set of grammar rules to each said token of said analysis tree by following analysis paths, including a low-cost analysis path, in order to find cost errors in said analysis tree;

determining which of said analysis paths is said low-cost analysis path, wherein said low-cost analysis path has the fewest said cost errors for said sentence; and reporting to said user any cost errors found in said analysis tree by analysis via said low-cost analysis path.

2. The process of claim 1 wherein:

each said grammar rule has a first, said first being a set of all properties that one of said tokens may possess in order to be compatible with said grammar rule; and during application of said set of grammar rules to said analysis tree, each said token is submitted for analysis only to those of said grammar rules for which said token satisfies said first.

3. The process of claim 2 wherein, during application of said set of grammar rules to said analysis tree, said set of grammar rules is applied in its entirety on one of said analysis paths prior to the application of any of said grammar rules to another of said analysis paths, until all of said analysis paths have been exhausted; and wherein said step of determining which of said analysis paths is said low-cost analysis path further comprises the steps of:

as said grammar rules are being applied to each said analysis path, maintaining a running count of said cost errors found therein;

assigning a cost to each analysis path which has had all of said grammar rules applied thereto, said cost being a function of the total of said cost errors found therein;

maintaining in a first memory address the one of said analysis paths which has had all of said grammar rules applied thereto and which has the lowest said cost;

maintaining in a second memory address said cost associated with said analysis path maintained in said first memory address;

aborting application of said grammar rules to any of said analysis paths for which said running count exceeds said cost maintained in said second memory address; and aborting application of said grammar rules to any of said analysis paths for which said running count exceeds a predetermined threshold cost.

4. The process of claim 3 further comprising the steps of:

after application of said set of grammar rules to said analysis tree, comparing said analysis tree with said original text; and reporting to said user any of said words in said original text which are different from said words corresponding to said tokens in said analysis tree.

5. The process of claim 4 further comprising the step of suggesting a grammatically correct alternative to each said cost error found.

6. The process of claim 5 wherein:

said analysis tree has levels of syntactic classifications arranged in hierarchical order of breadth; and in determining said grammatically correct alternative to said cost error, said grammatically correct alternative is generated with reference only to those of said levels of said analysis tree which are affected by said cost error.

7. The process of claim 6 further comprising the steps of:

as said grammar rules are being applied to said analysis tree, keeping track of a backtracking point within said analysis path where one of said cost errors was most recently found;

upon aborting application of said grammar rules to any of said analysis paths for which said running count exceeds said cost maintained in said second memory address, resuming application of said grammar rules from said backtracking point until all possible of said paths through said analysis tree from said backtracking point have been exhausted; and upon aborting application of said grammar rules to any of said analysis paths for which said running count exceeds said predetermined threshold cost, resuming application of said grammar rules from said backtracking point until all possible of said paths through said analysis tree from said backtracking point have been exhausted.

8. A computer system for checking the Brazilian-Portuguese grammar of original text provided by a user comprising:

means for receiving said original text as a string of accentuated characters, said original text having at least one sentence having a beginning, a word, punctuation, and an end;

means for generating, for each said sentence, at least one token, each said token corresponding to one said word in said sentence;

means for searching, for each said word in said sentence, an orthographic dictionary to find possible variations in spelling, meaning and grammatical classification;

means for expanding each said token to include said variations in spelling, meaning and grammatical classification of said corresponding word;

means for reporting any of said words that do not have exact matches in said orthographic dictionary to said user;

means for submitting each said token to a heuristic process for excluding any said variation which is incompatible with said token's juxtaposition within said sentence;

means for applying pre-analysis rules to each said token to identify and determine positionally correct alternatives for select pre-analysis errors in grammar based on the juxtaposition of each said word within said sentence;

means for reporting to said user said pre-analysis errors and said positionally correct alternatives;

means for generating an analysis tree for said sentence, said analysis tree containing all of said tokens for said sentence and recording syntactic classification of said tokens and groups of said tokens;

means for generating a set of grammar rules having terminal elements, special predicates, and non-terminal elements;

wherein each said grammar rule defines one of said non-terminal elements as a function of said terminal elements, other said non-terminal elements, and said special predicates;

wherein each of said non-terminal elements is defined by said grammar rules; wherein said terminal elements are defined implicitly in the analysis; wherein said special predicates dictate agreement analysis and analysis control; wherein each said grammar rule and each said token has a map of properties following the same format;

means for applying said set of grammar rules to each said token of said analysis tree by following analysis paths, including a low-cost analysis path, in order to find cost errors in said analysis tree;

means for determining which of said analysis paths is said low-cost analysis path, wherein said low-cost analysis path has the fewest said cost errors for said sentence; and means for reporting to said user any cost errors found in said analysis tree by analysis via said low-cost analysis path.

9. The system of claim 8 wherein:

each said grammar rule has a first, said first being a set of all properties that ne of said tokens may possess in order to be compatible with said grammar rule; and during application of said set of grammar rules to said analysis tree, each said token is submitted for analysis only to those of said grammar rules for which said token satisfies said first.

10. The system of claim 9, wherein, during application of said set of grammar rules to said analysis tree, said set of grammar rules is applied in its entirety on one of said analysis paths prior to the application of any of said grammar rules to another of said analysis paths, until all of said analysis paths have been exhausted; and wherein said means for determining which of said analysis paths is said low-cost analysis path further comprises:

means for maintaining a running count of said cost errors found in each said analysis path as said grammar rules are being applied thereto;

means for assigning a cost to each analysis path which has had all of said grammar rules applied thereto, said cost being a function of the total of said cost errors found therein;

means for maintaining in a first memory address the one of said analysis paths which has had all of said grammar rules applied thereto and which has the lowest said cost;

means for maintaining in a second memory address said cost associated with said analysis path maintained in said first memory address;

means for aborting application of said grammar rules to any of said analysis paths for which said running count exceeds said cost maintained in said second memory address; and means for aborting application of said grammar rules to any of said analysis paths for which said running count exceeds a predetermined threshold cost.

11. The system of claim 10 further comprising:

means for comparing said analysis tree with said original text after application of said set of grammar rules to said analysis tree; and means for reporting to said user any of said words in said original text which are different from said words corresponding to said tokens in said analysis tree.

12. The system of claim 11 further comprising:

means for suggesting a grammatically correct alternative to each said cost error found;

wherein said analysis tree has levels of syntactic classifications arranged in hierarchical order of breadth; and in determining said grammatically correct alternative to said cost error, said grammatically correct alternative is generated with reference only to those of said levels of said analysis tree which are affected by said cost error.

13. The system of claim 12 further comprising:

as said grammar rules are being applied to said analysis tree, means for keeping track of a backtracking point within said analysis path where one of said cost errors was most recently found;

upon aborting application of said grammar rules to any of said analysis paths for which said running count exceeds said cost maintained in said second memory address, means for resuming application of said grammar rules from said backtracking point until all possible of said paths through said analysis tree from said backtracking point have been exhausted; and upon aborting application of said grammar rules to any of said analysis paths for which said running count exceeds said predetermined threshold cost, means for resuming application of said grammar rules from said backtracking point until all possible of said paths through said analysis tree from said backtracking point have been exhausted.

\* \* \* \* \*